United States Patent [19]

Kilgore et al.

[11] 3,957,289

[45] May 18, 1976

[54] SOLDERED JOINT AND METHOD

[75] Inventors: Colin H. Kilgore, New Kensington; Norman P. Wolff, Pittsburgh, both of Pa.

[73] Assignee: Aluminum Company of America, Pittsburgh, Pa.

[22] Filed: Aug. 19, 1974

[21] Appl. No.: 498,704

[52] U.S. Cl. .................................. 285/22; 228/165; 228/259; 285/287; 285/157
[51] Int. Cl.² ..................... F16L 13/08; B23K 31/02
[58] Field of Search .......... 29/483, 484, 503, 157.6, 29/157.3 R; 228/36, 37, 40, 164, 165, 170, 171, 153, 154, 259, 260; 285/22, 287, 13, 153, 157

[56] References Cited
UNITED STATES PATENTS
3,833,986   9/1974   DeCicco ......................... 29/503 X

*Primary Examiner*—James L. Jones, Jr.
*Assistant Examiner*—Margaret Joyce
*Attorney, Agent, or Firm*—Irvin V. Gleim

[57] ABSTRACT

The present invention relates to the making of an evaporator or condenser construction wherein ends of heat exchange tubes extending through heat exchange plates or fins are joined with return bend connectors. The ends of the tubes are provided with flared cups that telescopically receive the ends of return bend connectors. Nibs are formed on the outer surface of and extend outwardly a predetermined amount from the outer surface of the return bend connectors near the ends thereof. Grooves are formed on said outer surface and extend longitudinally between each nib and the end of the connector. When the end of a return bend connector is inserted into a flared cup, an interference fit between the nibs and the cup centers the end of the connector in the cup and frictionally retains the tube and the return bend in assembled relation when the assembly is inverted and thereafter submerged in a solder bath. The grooves provide vents for hot gases during the soldering operation.

10 Claims, 5 Drawing Figures

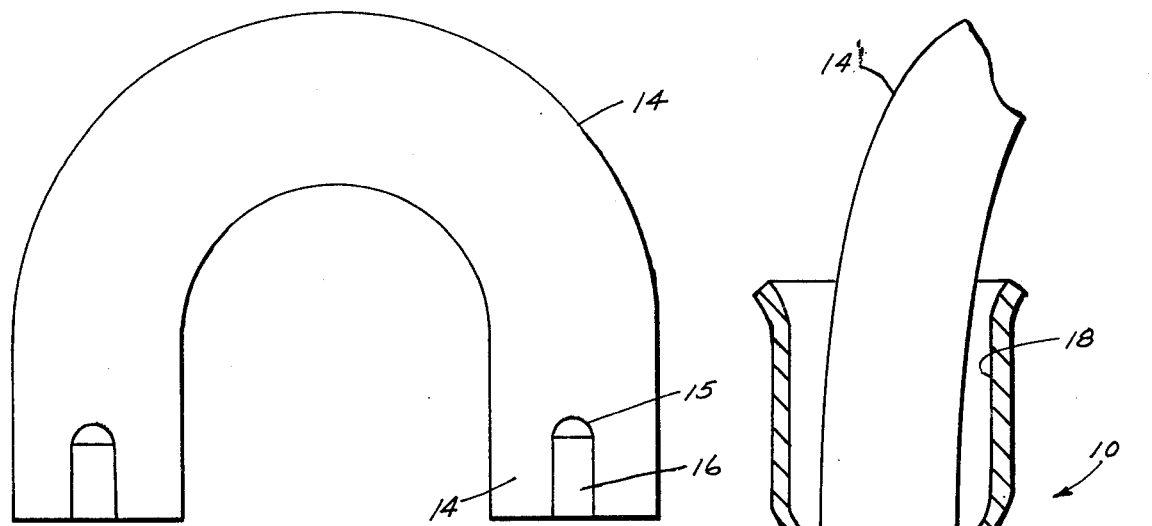
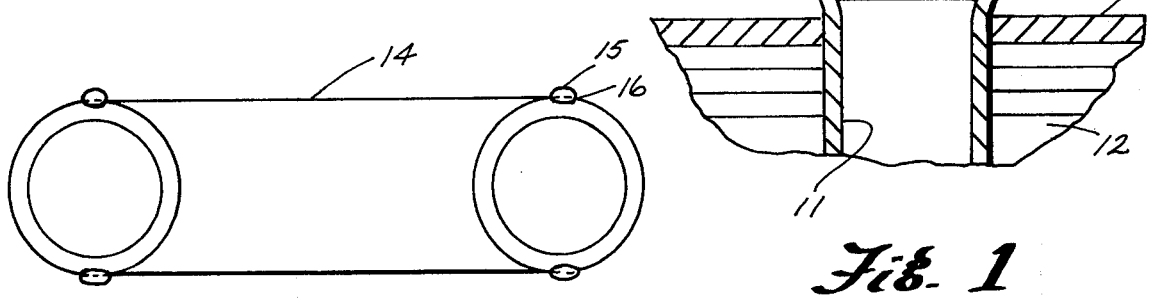
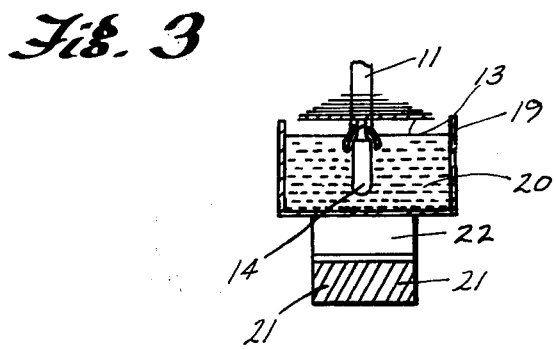
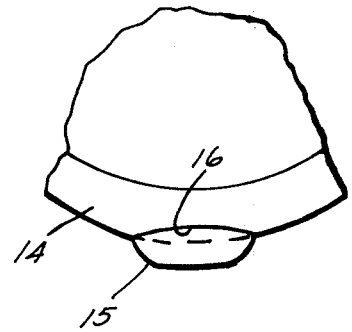

SOLDERED JOINT AND METHOD

BACKGROUND AND SUMMARY OF THE INVENTION

The present invention relates to metal joints and, more particularly, to improved means and method for soldering return bend connectors to heat exchange tubes of heat exchangers wherein at least one of the members is aluminum.

A joint between tubular members of a heat exchange must provide a freon tight seal to assure the integrity of the heat exchanger system. The soldering of such joints, particularly where one or both of the tubular members is aluminum, presents certain problems such as difficulties resulting from a tenacious oxide coating that normally forms on aluminum and prevents the making of a good soldered joint, as well as the need for complex and expensive tooling in order to provide great dimensional accuracy and proper alignment of members to be joined because solder employed in forming aluminum joints does not flow readily into small spaces. While it is desirable to employ relatively large clearances in the joint to facilitate the flow of solder, it has been found that there is a maximum clearance as well as a minimum clearance that should be controlled.

Prior attempts at joining multi-row aluminum return bend connectors to heat exchanger tubes by the application of ultra-sonic energy to the solder bath during a dip soldering operation have achieved a certain degree of success but have not provided a satisfactory solution to other problems including the proper alignment of the members to be joined, the provision of means securing the members together to prevent their separation when they are inverted during a dip soldering operation, and the provision of proper venting of hot gases generated during the soldering operation.

In accordance with the present invention, longitudinal grooves are formed along the outer surface of a first tubular element and the metal displaced in forming the grooves forms projections or nibs depending outwardly from said surface a predetermined distance for an interference fit when said element is assembled telescopically in a solder cup formed in another tubular element. The frictional engagement resulting from the interference fit prevents separation of the elements when they are inverted and insures proper alignment thereof, and the grooves provide vent passageways for hot gases generated during a soldering operation.

DESCRIPTION

Other objects and advantages of the invention will become apparent from the following description taken in connection with the accompanying drawings, in which:

FIG. 1 is a fragmentary sectional view of an evaporator or condenser assembly constructed in accordance with the present invention;

FIG. 2 is a side elevation view of a return bend connector embodying the present invention;

FIG. 3 is a bottom plan view of the embodiment of FIG. 2;

FIG. 4 is an enlarged fragmentary view of a groove and a depending nib portion of FIG. 3; and FIG. 5 is a cross-sectional view of an inverted assembly of FIG. 1 passing through a molten solder bath.

In the drawings, a heat exchanger assembly is illustrated at 10. The heat exchanger may be of the type having a plurality of rows parallel heat exchange tube members 11 (only one of which is shown) extending through a plurality of plate fins 12 which are disposed between a pair of tube sheets 13 (only one of which is shown) to form a plate fin heat exchanger. A plurality of return bend connector tubes 14 (only one of which is shown) are connected between adjacent heat exchange tubes 11.

The return bend connector tubes are formed from straight tubes by bending the tubes into an essentially U-shape and such bending operation results in the cross-sectional configuration of the tubes becoming flattened. This flattened configuration is then reformed to a generally circular configuration by a sizing machine that inserts a mandrel, having a circular cross-section, into the ends of the return bend tube and thereafter withdraws the mandrel upon completion of the reforming operation.

In accordance with the present invention, the longitudinal reciprocating motion of the sizing machine is utilized to carry a tool which plows a longitudinally extending groove 16 in the outer surface of the tube wall and in a direction away from the tube ends, the groove material thereby displaced forming a centering nib 15 depending outwardly from the outer surface of the tube wall and disposed at a controlled predetermined distance from the ends of the return bend tube. As illustrated in FIG. 3, four grooves 16 and four nibs 15 are formed at the ends of a return bend tube 14.

As is best shown in FIG. 1, the outer ends of heat exchanger tubes 11 include a cup portion 17 and a flared solder cup portion 18. The diameter of cup portion 17 is slightly larger than the outer diameter of the distal end of return bend tube 14 to facilitate assembly but the fit there between is sufficiently close to prevent a flow of solder when said end of tube 14 is seated in cup portion 17. The diameter of the cup portion 17 is made slightly less than the corresponding distance between the outer extremities of two opposed nibs 15 so as to cause a slight interference fit of the nibs with the inner surface of cup portion 17 when an end of the return bend tube is seated therein.

During the assembly operation, shortly after the end of return bend tube 14 is inserted into the cup portion 17, the nibs 15 engage the inner surface of the cups portion and thus center and properly align tube 14 until its end is seated in cup portion 17, as shown in FIG. 1. The interference fit between the nibs and the cup portion 17 provides sufficient frictional force to prevent separation of tubes 11 and 14 when or if the assembly is inverted.

Upon completion of the assembly, the heat exchanger 10 is inverted and passed through a solder pot 19 containing molten solder 20 or other filler alloy and which may be provided with an ultrasonic transducer 21 and horn 22. Grooves 16 provide passageways through which hot gases generated during the soldering process are vented to the interior of tubes 11 which, in turn, are vented to the ambient atmosphere. The present invention is suitable for use in connection with other joining techniques and is not necessarily limited to an ultrasonic soldering operation. Thus, there is comprehended within the scope of the present invention any joining process wherein filler material is placed in flared cup portion 18 in either an upright position in molten state, or in solid state followed by heating the material to molten state, which material is capable of wetting the surfaces to be joined with or without the addition or supplying of other material and/or energy.

While a particular embodiment of the invention has been illustrated and described, it will be understood that various changes and modifications can be made without departing from the invention and it is intended in the appended claims to cover all such changes and modifications that fall within the true spirit and scope of the invention.

What is claimed is:

1. A hollow tubular member having an outer surface and a terminal end and an adjacent portion adapted to be telescopically received in close fitting relationship in a cup portion of another member prior to a soldering operation,
   a nib depending from and projecting outwardly from said surface at a location spaced apart from said end, and
   a groove in said outer surface extending longitudinally of said member between said nib and said end and providing a vent passageway for hot gases during a soldering operation while said tubular member is telescopically received in said cup portion.

2. Structure according to claim 1 and additionally including
   a second nib and a second groove oppositely disposed relative to said first mentioned nib and groove respectively.

3. Structure according to claim 1 and additionally including
   other nibs and other grooves each symmetrically spaced apart circumferentially relative to said first mentioned nib and groove respectively.

4. Structure according to claim 1 wherein said tubular member is a return bend connector tube.

5. Structure according to claim 2 wherein said member is a return bend connector tube.

6. Structure according to claim 3 wherein said member is a return bend connector tube.

7. A method of joining metal tubes comprising
   providing a female metal tube member having a flared cup end portion,
   providing a male metal tube member having a distal end adapted to be received by said cup portion and to seat against an inner surface of said flared cup portion,
   forming a plurality of nibs spaced apart circumferentially on the outer surface of said male member and spaced apart from said distal end thereof, and also forming at least one groove on said outer surface and extending longitudinally of said male member between said distal end and one of said nibs,
   bringing said distal end into aligned telescoping engagement within said cup portion with said nibs in interference fit engagement with the interior wall surface of said cup portion to provide a frictionally secured joint,
   flowing molten filler alloy into said cup portion, and thereafter solidifying said alloy.

8. A method according to claim 7 wherein said flowing step includes positioning said joint in a supply of molten filler alloy.

9. The method of claim 8 in which the frictionally secured joint is inverted before being positioned in the supply of the molten filler alloy.

10. The method of claim 8 including the additional steps of
    flowing the molten filler alloy between the tube members adjacent to the nibs,
    wetting the surfaces of the tube members positioned in the supply of the filler alloy with the filler alloy,
    venting hot gases through the grooves provided in the male member, and
    removing the frictionally secured joint from the supply of the molten filler alloy.

* * * * *

Dedication 3,957,289.—*Colin H. Kilgore*, New Kensington, and *Norman P. Wolff*, Pittsburgh. Pa. SOLDERED JOINT AND METHOD. Patent dated May 18, 1976. Dedication filed Feb. 11, 1977, by the assignee, *Aluminum Company of America*.

Hereby dedicates to the Public the remaining term of said patent.

[*Official Gazette May 24, 1977.*]